United States Patent
Dianetti et al.

(10) Patent No.: US 12,469,910 B2
(45) Date of Patent: *Nov. 11, 2025

(54) ELECTROCHEMICAL CELL CASING HAVING AN ANNULAR SIDEWALL SECURED TO A BASE PLATE BY A CERAMIC-TO-GLASS-TO-METAL SEAL

(71) Applicant: Greatbatch Ltd., Clarence, NY (US)

(72) Inventors: David Dianetti, Lancaster, NY (US); Lasantha Viyannalage, Pittsford, NY (US); Ho chul Yun, East Amherst, NY (US); Robert S. Rubino, Williamsville, NY (US); Marcus J. Palazzo, Wheatfield, NY (US); Jared Arellano, Akron, NY (US)

(73) Assignee: Greatbatch Ltd., Clarence, NY (US)

( * ) Notice: Subject to any disclaimer, the term of this patent is extended or adjusted under 35 U.S.C. 154(b) by 1022 days.

This patent is subject to a terminal disclaimer.

(21) Appl. No.: 17/483,241

(22) Filed: Sep. 23, 2021

(65) Prior Publication Data

US 2022/0166095 A1    May 26, 2022

Related U.S. Application Data

(60) Provisional application No. 63/116,219, filed on Nov. 20, 2020.

(51) Int. Cl.
*H01M 50/00* (2021.01)
*H01M 50/109* (2021.01)
(Continued)

(52) U.S. Cl.
CPC ....... *H01M 50/171* (2021.01); *H01M 50/109* (2021.01); *H01M 50/186* (2021.01); *H01M 50/191* (2021.01); *H01M 50/636* (2021.01)

(58) Field of Classification Search
CPC . H01M 50/191; H01M 50/109; H01M 50/636
See application file for complete search history.

(56) References Cited

U.S. PATENT DOCUMENTS

| 5,415,959 A | 5/1995 | Pyszczek et al. |
| 6,610,443 B2 | 8/2003 | Paulot et al. |

(Continued)

FOREIGN PATENT DOCUMENTS

| EP | 1441400 A1 | 7/2004 |
| EP | 1914818 A1 | 4/2008 |

(Continued)

OTHER PUBLICATIONS

Inoue et al, Non-aqueous electrolyte battery has metal rings hermetically sealed around terminals by insulating glass or ceramic sealing material, May 2000, See the Abstract. (Year: 2000).*

*Primary Examiner* — Niki Bakhtiari
*Assistant Examiner* — Monique M Wills
(74) *Attorney, Agent, or Firm* — Michael F. Scalise

(57) ABSTRACT

A miniature electrochemical cell of a primary or secondary chemistry with a total volume that is less than 0.5 cc is described. The cell casing comprises an annular sidewall connected to a base plate opposite an upper lid. A sealing glass forms a hermetic glass-to-ceramic seal with a dielectric material contacting a lower portion of the annular sidewall and a glass-to-metal seal with the base plate. Since the glass seals against three surfaces of the annular sidewall, which are the inner and outer sidewall surfaces adjacent to the lower edge, the glass seal is robust enough to withstand the heat generated when the lid is welded to the upper edge of the annular sidewall. The lid has a sealed electrolyte fill port that is axially aligned with an annulus residing between the inner surface of the annular sidewall and the electrode assembly.

21 Claims, 5 Drawing Sheets

(51) Int. Cl.
*H01M 50/171* (2021.01)
*H01M 50/186* (2021.01)
*H01M 50/191* (2021.01)
*H01M 50/636* (2021.01)

(56) References Cited

U.S. PATENT DOCUMENTS

| | | | |
|---|---|---|---|
| 7,128,765 | B2 | 10/2006 | Paulot et al. |
| 10,446,825 | B2 | 10/2019 | Voss et al. |
| 10,957,884 | B1 | 3/2021 | Dianetti et al. |
| 2006/0037190 | A1* | 2/2006 | Rubino ............... H01M 50/191 29/623.2 |
| 2011/0097623 | A1 | 4/2011 | Marinis et al. |

FOREIGN PATENT DOCUMENTS

| | | | | |
|---|---|---|---|---|
| EP | 3926740 | A1 | 12/2021 | |
| FR | 2786320 | A1 * | 5/2000 | ........ H01M 10/0431 |
| WO | 2017025858 | A1 | 2/2017 | |

\* cited by examiner

ELECTROCHEMICAL CELL CASING HAVING AN ANNULAR SIDEWALL SECURED TO A BASE PLATE BY A CERAMIC-TO-GLASS-TO-METAL SEAL

CROSS-REFERENCE TO RELATED APPLICATION

This application claims priority to U.S. provisional patent application Ser. No. 63/116,219, filed on Nov. 20, 2020.

BACKGROUND OF THE INVENTION

1. Field of the Invention

The present invention relates to the conversion of chemical energy to electrical energy. More particularly, the present invention relates to an electrochemical cell having a total size or volume that is less than 0.5 cc. Such so-called miniature electrochemical cells enable numerous new and improved medical device therapies. Miniature electrochemical cells are defined as those having a size or total volume that is less than 0.5 cc.

2. Prior Art

U.S. Pat. No. 10,957,884 to Dianetti et al., which is assigned to the assignee of the present invention and incorporated herein by reference, describes a miniature electrochemical cell housed in a metallic casing consisting of three main components: a base plate supporting a cylindrically-shaped annular sidewall having an open upper end closed with a cover plate or lid. The base plate, annular sidewall and lid are each of a metal material, for example, titanium.

The annular sidewall is selectively coated with a dielectric or ceramic material to provide electrical isolation of the to-be-housed first active material, for example, a cathode active material, from the metallic annular sidewall. A sealing glass is applied to the perimeter of the base plate with the annular sidewall supported on the glass. The annular sidewall and base plate are heated to a temperature that is sufficient to achieve a glass-to-ceramic seal with the dielectric material coating the annular sidewall and a glass-to-metal seal with the base plate. The thickness of the sealing glass combined with the glass seal bonds at the base plate and at the dielectric or ceramic material coating the annular sidewall are sufficient to ensure electrical isolation between the base plate and the supported annular sidewall.

A layer of a first active material, for example, a cathode active material, is deposited into the cavity formed by the base plate/annular sidewall subassembly. The cathode active material is in electrical continuity with the base plate, which serves as the positive terminal for the cell, but which is electrically isolated from the annular sidewall by the above described sealing glass and dielectric material. A separator is supported on the exemplary cathode active material.

Separately, a layer of a second active material, for example, an anode active material, is contacted to an inner surface of the lid. The metallic lid/second active material subassembly is then seated on an inner step of the annular sidewall, and the lid and sidewall are welded together. In this construction, the lid connected to the annular sidewall is in electrical continuity with the anode active material to thereby serve as the negative terminal for the cell.

Finally, the electrode assembly is activated with an electrolyte filled into the casing through a fill port in the lid. The fill port is then sealed with a closure member welded therein or by melting the material of the lid into a solid mass closing the fill port.

However, a vexing problem in a miniature electrochemical cell having a size or total volume that is less than 0.5 cc is that during laser welding of the lid to the annular sidewall, thermal transfer to the glass-to-ceramic seal and to the glass-to-metal seal that bond the base plate to the annular sidewall becomes challenging. When the distance from the lid/annular sidewall weld site to the glass-to-ceramic seal and to the glass-to-metal seal at the base plate/annular sidewall is very small, which is the case in a miniature cell having a size or total volume that is less than 0.5 cc, thermal energy transfer to the glass seals increases their crack susceptibility.

Thus, there is a need for an improved miniature electrochemical cell that is capable of being hermetically closed by welding without structurally compromising the glass-to-ceramic seal at the dielectric coated annular sidewall and at the glass-to-metal seal at the metal base plate. The present electrochemical cell provides such a robust design for the base plate serving as one terminal for the cell and being connected to the opposite polarity annular sidewall.

SUMMARY OF THE INVENTION

To help improve the structural integrity of the base plate hermetically connected to the annular sidewall by the sealing glass, the present electrochemical cell utilizes a so-called "tongue and groove" construction that increases the bonded surface area between the base plate and the annular sidewall by approximately three times in comparison to the base plate/annular sidewall connection shown in U.S. Pat. No. 10,957,884 to Dianetti et al. While not a traditional tongue and groove connection where each piece has a slot (the groove) cut along one edge, and a thin, deep ridge (the tongue) on the opposite edge, the base plate has an annular channel, which serves as a groove. A pre-form of glass is positioned in the channel and then the lower edge of the annular sidewall serving as a tongue sits on the glass. This subassembly is then heated to flow the glass into intimate contact with a dielectric material contacting the lower edge and to wick part-way up the height of the dielectric material coating the inner and possibly the outer surfaces of the annular sidewall. Upon cooling, the glass forms a hermetic glass-to-ceramic seal with the dielectric material contacting the annular sidewall and a glass-to-metal seal with the base plate. Since the glass seals against three surfaces of the annular sidewall, which are the lower annular edge and both the inner and outer sidewall surfaces adjacent to the lower edge, the ability to generate tensile stresses along any single face is greatly reduced. This is combined with there being three times as much sealing contact in comparison to the conventional design shown in the previously discussed Dianetti et al. patent. That way, the glass seal between the annular sidewall and the base plate is better capable of withstanding the heat generated when the lid is welded to the upper end of the annular sidewall without being structurally compromised.

The electrochemical cell of the present invention also has the electrolyte fill port positioned close to but spaced inwardly from the annular peripheral edge of the lid. Inside the casing, an annulus resides between the inner surface of the annular sidewall and the electrode assembly comprising the cathode active material and the spaced apart anode active material. The electrolyte fill port is axially aligned with this annulus, which allows the casing to be filled with electrolyte using a vacuum filling process so that activating electrolyte readily wets the anode and cathode active materials and the intermediate separator. Without the fill port being axially aligned with the annulus between the electrode assembly and casing sidewall, it is sometimes difficult for electrolyte to sufficiently wet the opposite polarity electrode active materials to promote acceptable cell discharge.

Additionally, the lid contains an embossed rim around the perimeter and around the fill port. This embossed rim is utilized during the laser welding process to absorb energy and act as a filler material into the weld joint. The energy absorption from the embossed rim helps mitigate any cracking of the glass-to-ceramic seal at the annular sidewall and the glass-to-metal seal at the base plate.

While the present cell designs are adapted for miniature electrochemical cells, they are also applicable to cells that have a total volume that is greater than 0.5 cc and are not classified as "miniature". Moreover, the present electrochemical cells are not limited to any one chemistry; they can be an alkaline cell, a primary lithium cell, a rechargeable lithium cell, a Ni/cadmium cell, a Ni/metal hydride cell, a supercapacitor, a thin film solid-state cell, and the like. One preferred chemistry is a lithium-ion electrochemical cell comprising a carbon-based or $Li_4Ti_5O_{12}$-based anode and a lithium metal oxide-based cathode, such as of $LiCoO_2$ or lithium nickel manganese cobalt oxide ($LiNi_aMn_bCo_{1-a-b}O_2$). The lithium-ion electrochemical cell is activated with a liquid electrolyte.

These and other aspects of the present invention will become increasingly more apparent to those skilled in the art by reference to the following detailed description and to the appended drawings.

DETAILED DESCRIPTION OF THE PREFERRED EMBODIMENTS

Figure 1:
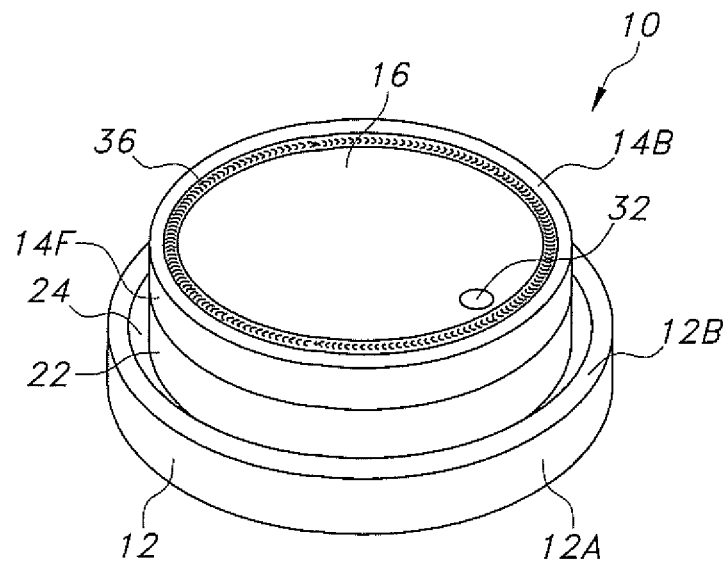
FIG. 1 is a perspective view of an electrochemical cell 10 according to the present invention.
Figure 2:
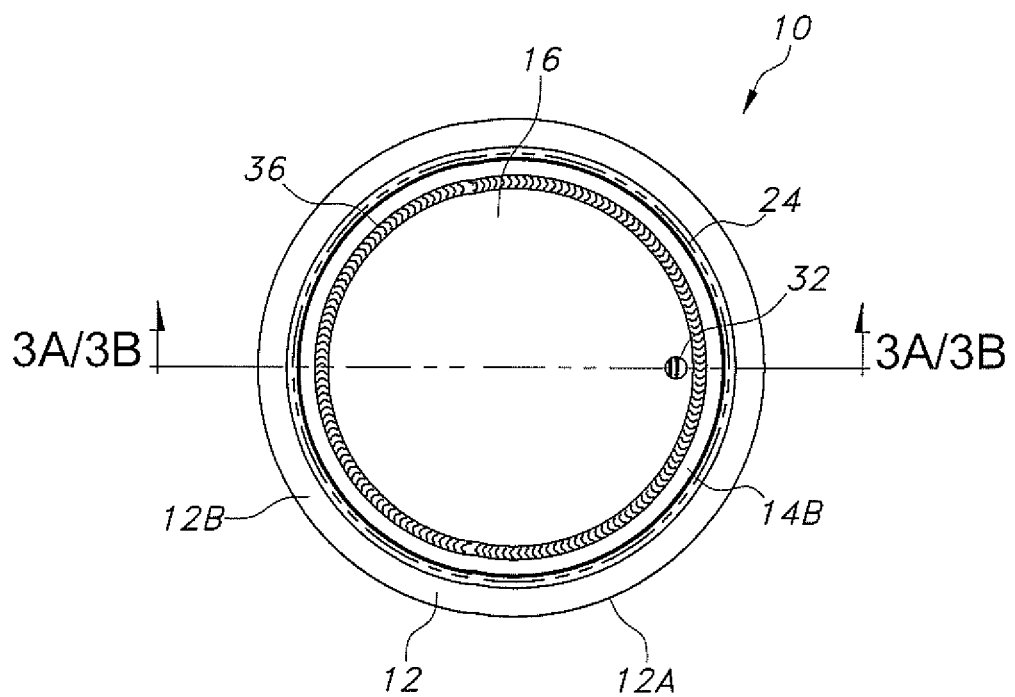
FIG. 2 is a plan view of the electrochemical cell 10 shown in FIG. 1.

Turning now to the drawings, FIG. 1 illustrates an exemplary electrochemical cell 10 according to the present invention. The electrochemical cell 10 comprises an electrode assembly housed in a hermetically sealed casing. The casing comprises a base plate 12 supporting an annular sidewall 14 having an open end closed by a plate-shaped cover or lid 16. The base plate 12, annular sidewall 14 and lid 16 are each of a biocompatible metal, for example, titanium. In addition to titanium, suitable materials for the base plate 12, annular sidewall 14 and lid 16 include stainless steel, mild steel, nickel-plated mild steel, but not limited thereto, so long as the metallic material is compatible for use with the other cell components.

Figure 4:
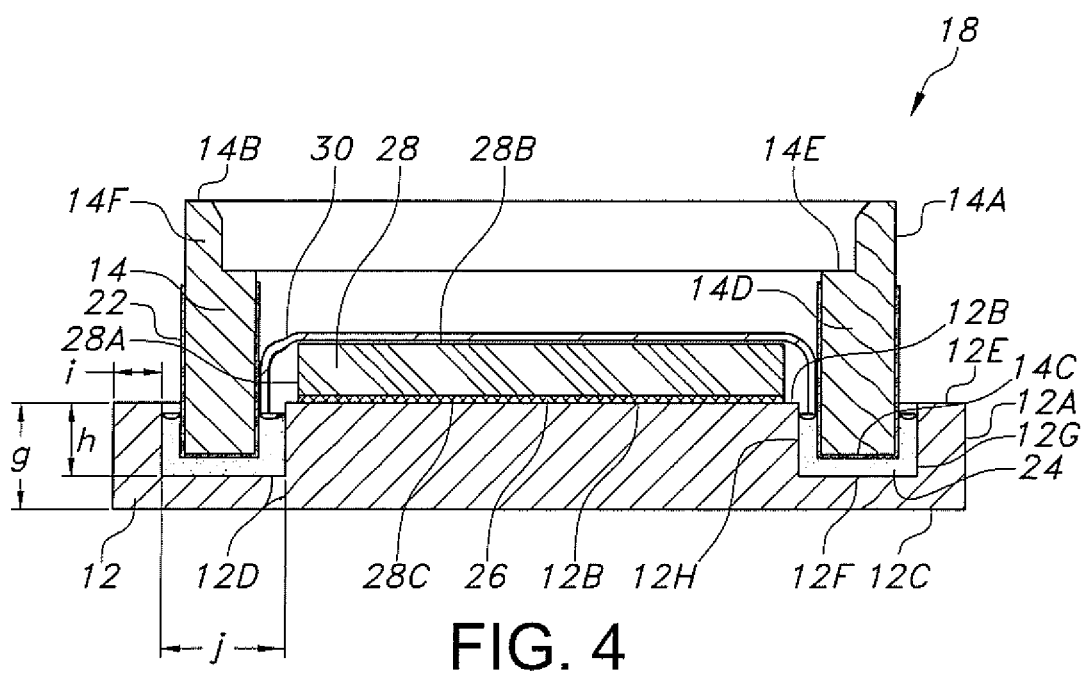
FIGS. 4 and 5 illustrate that the electrochemical cell 10 shown in FIGS. 1 to 3 is assembled from a casing first or base subassembly 18 (FIG. 4) and a casing second or upper subassembly 20 (FIG. 5).
Figure 5:
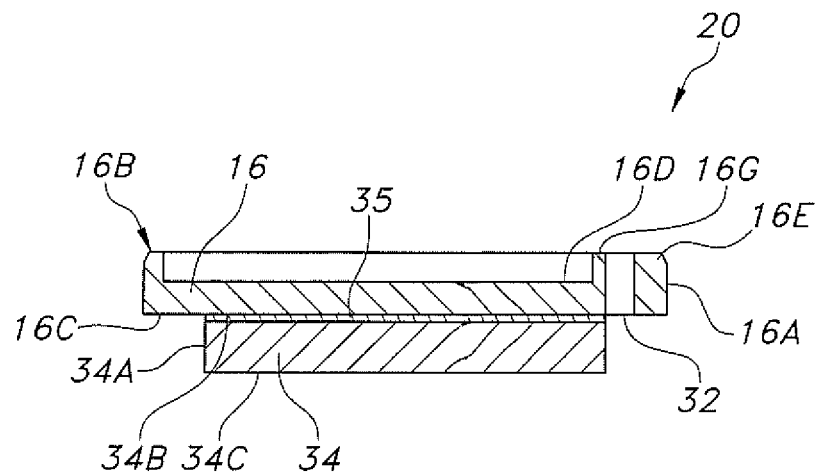
Figure 6:
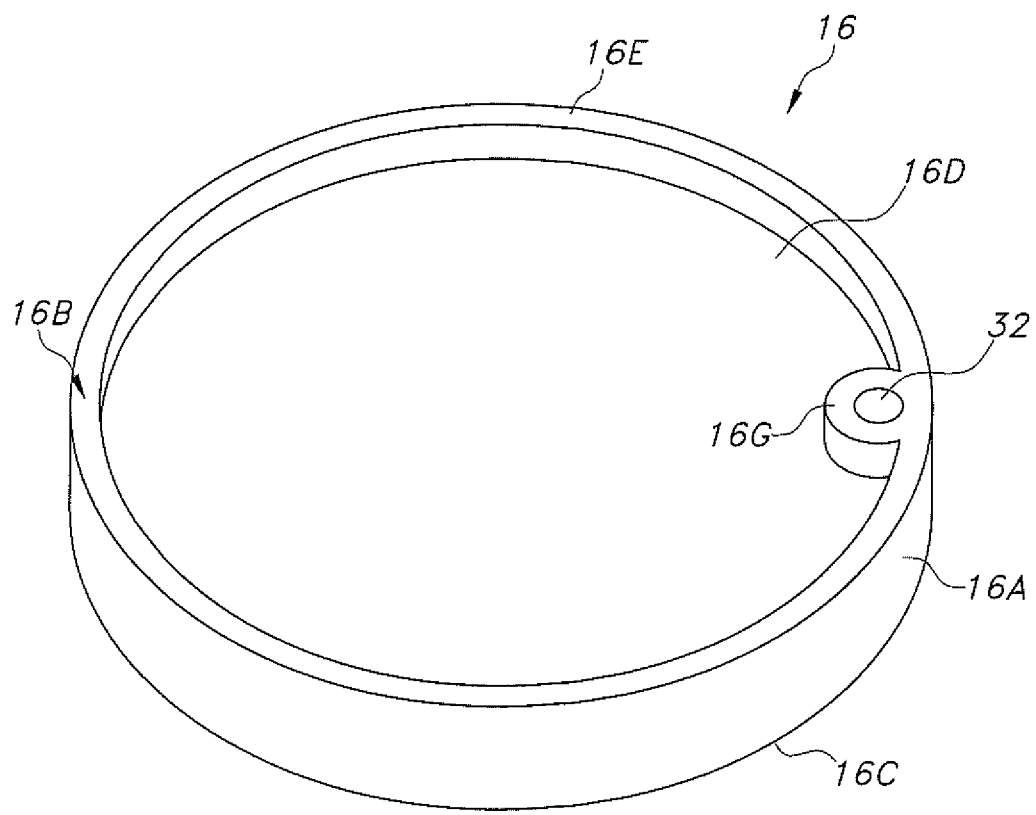
FIG. 6 is a perspective view of the lid 16 for the electrochemical cell 10 shown in FIGS. 1 to 3 having an embossed electrolyte fill port 32.

FIGS. 4 and 5 illustrate that the casing for the cell 10 is assembled from a first or base subassembly 18 (FIG. 4) and a second or upper subassembly 20 (FIG. 5). The base subassembly 18 comprises the base plate 12 having an annular peripheral edge 12A extending to and meeting a base plate upper surface 12B spaced from a base plate lower surface 12C. An annular channel 12D extends part-way into the thickness of the base plate 12 from the upper surface 12B but ends spaced from the lower surface 12C. The annular channel 12D is spaced inwardly from the annular peripheral edge 12A.

The thickness of the base plate 12 is defined as the distance "g" (FIG. 4) measured from the upper surface 12B to the lower surface 12C and ranges from about 0.012 inches to about 0.018 inches. The annular channel 12D is spaced radially inwardly from the annular edge 12A to form a channel annular rim 12E having a height "h" measured from the channel lover surface 12F to the upper surface 12B of the base plate 12, and a width "i" measured from the peripheral edge 12R to a distal surface 12G of the channel 12D. The height of the channel annular rim ranges from about 0.007 inches to about 0.013 inches while the width "i" ranges from about 0.005 inches to about 0.010 inches. Finally, the channel 12D has a width "j" measured from a channel proximal surface 12H to the channel distal surface 12G that ranges from about 0.010 inches to about 0.020 inches.

FIGS. 1, 3A, 3B and 4 further show that the annular sidewall 14 comprises a cylindrically shaped outer surface 14A extending to an upper annular edge 14B spaced from a lower annular edge 14C. The upper and lower annular edges 14B, 14C reside along respective imaginary planes that are substantially parallel to each other. An inner surface of the annular sidewall 14 has a first or lower cylindrically-shaped portion 14D extending upwardly part-way along the height of the sidewall 14 from the lower annular edge 14C to a step 14E. A second or upper cylindrically-shaped portion 14F extends upwardly from the step 14E to the upper annular edge 14B.

An annular layer of dielectric material 22, for example, an alumina ($Al_2O_3$) material, is coated on the lower edge 14C and the inner surface of the lower cylindrically-shaped portion 14D of the annular sidewall 14. For ease in manufacturing, the dielectric material 22 may also be coated on the outer surface 14A of the sidewall 14. While the dielectric material 22 is shown in FIGs. 1, 3A, 3B and 4 extending along the lower cylindrically-shaped portion 14D of the annular sidewall 14 to the step 14E, to function properly it need only extend along the inner portion 14D to a height that is greater than the thickness of the active material (either cathode or anode) that will subsequently nest in the casing base subassembly 18.

FIGS. 1, 2, 3A, 3B and 4 further show that the base plate 12 has a diameter at its annular peripheral edge 12A that is significantly greater than the outer diameter of the annular sidewall 14. To secure the base plate 12 to the annular sidewall 14, an endless ring of sealing glass 24 is nested or positioned in the previously described annular channel 12D. The lower edge 14C of the annular sidewall is then positioned on the upper surface of the glass 24. Depositing the sealing glass 24 in the annular channel 12D is achieved by several suitable methods including screen printing, dispensing, dipping into a frit paste or the use of a preformed endless glass ring. Suitable sealing glasses include both vitreous and crystallizing compositions that exhibit goad electrical isolation properties and form mechanical bonds with good wetting characteristics to the metals of the base plate 12 and the annular sidewall 14. Exemplary sealing glasses include, but are not limited to, Ferro IP510, Corning 1890, Schott 8422 and Schott 8629.

The base plate 12, sealing glass 24 and annular sidewall 14 comprising the casing base subassembly 18 are then heated to a temperature that is sufficient to burn off any organic binders that may be present in the glass 24 and flow the glass into intimate contact with the dielectric material 22 contacting the lower annular edge 14C and to wick part-way up and along the height of the dielectric material coating the inner surface and possibly the outer surface of the lower cylindrically-shaped portion 14D of the sidewall 14. Upon cooling, the glass 24 forms a hermetic glass-to-ceramic seal with the dielectric material coating the annular sidewall 14 and a glass-to-metal seal with the base plate 12. The sealing glass 24 has a thickness that ranges from about 0.002 inches to about 0.0025 inches between where it contacts the dielectric material 22 supported on the annular sidewall 14 and the facing distal surface 12G, lower surface 12F and proximal surface 12H of the annular channel 12D in the base plate 12. This is sufficient to ensure electrical isolation between the base plate 12 and the annular sidewall 14.

After the base plate 12 and the annular sidewall 14 are secured together by the intermediate sealing glass 24, in an exemplary secondary system (FIG. 3B), a conductive carbonaceous coating 26 is deposited on the upper surface 12B of the base plate. This is followed by a first electrode active material 28, for example, a cathode active material, being supported on the carbonaceous coating 26. The cathode active material 28 preferably extends to an outer edge 28A that is spaced inwardly from the annular dielectric coating 22 on the inner surface of the lower cylindrically-shaped portion 14D of the annular sidewall 14. That way, the exemplary cathode active material 28 is in electrical continuity with the base plate 12 through the conductive carbonaceous coating 26.

In a primary system (FIG. 3A), the first electrode active material 28 is an anode active material, for example lithium, and the carbonaceous coating 26 is not needed.

In the exemplary secondary system (FIG. 3B), the cathode active material 28 is deposited on the conductive carbonaceous coating 26 using any one of many suitable methods (i.e. dispensed, pressed, preformed, sprayed, sputter deposition, evaporation deposition, tape casted, and as a coating). While not intending to limit the present electrochemical cell 10, the cathode active material 28 has a thickness extending to its upper and lower faces 28B, 28C that ranges from about 5 µm to about 1 mm. In other embodiments, the cathode active material 28 has a thickness that is greater than 1 mm. Suitable cathode active materials 28 for both the primary and secondary systems are selected from $LiCoO_2$, $LiNiO_2$, $LiMnO_2$, TiS, FeS, $FeS_2$, $CF_x$, $Ag_2O$, $Ag_2O_2$, $Ag_2CrO_4$, silver vanadium oxide (SVO), copper silver vanadium oxide (CSVO), $V_2O_5$, $MnO_2$, and lithium nickel manganese cobalt oxide ($LiNi_aMn_bCo_{1-a-b}O_2$).

If desired, the cathode active material 28 is mixed with a binder material and a solvent prior to being deposited on the conductive carbonaceous coating 26. Binders such as, but not limited to, a powdered fluoro-polymer, more preferably powdered polytetrafluoroethylene or powdered polyvinylidene fluoride and solvents, such as but not limited to, trimethylphosphate (TMP), dimethylformamide (DMF), dimethylacetamide (DMAc), tetramethylurea (TMU), dimethylsulfoxide (DMSO), or n-methyl-2-pyrrolidone (NMP) may be used.

In addition, up to about 10 weight percent of a conductive diluent may be added to the cathode active material 28 to improve conductivity. Suitable materials for this purpose include acetylene black, carbon black, and graphite or, a metallic powder such as powdered nickel, aluminum, titanium, and stainless steel.

A separator 30 (FIGS. 3A, 3B and 4) is placed on top of the active material 28. The separator 30 preferably extends to the dielectric material 22 coating the inner surface of the lower cylindrically-shaped portion 14D of the annular sidewall 14. The separator 30 may also contact the sealing glass 24 supported on the base plate 12 and has a thickness that ranges from about 5 µm to about 30 µm.

Illustrative separator materials include non-woven glass, polypropylene, polyethylene, microporous materials, glass fiber materials, ceramics, the polytetrafluorethylene membrane commercially available under the designations ZITEX (Chemplast Inc.), the polypropylene membrane commercially available under the designation CELGARD (Celanese Plastic Company Inc.) and DEXIGLAS (C. H. Dexter, Div., Dexter Corp.). Other separator materials that are useful with the present invention include woven fabrics comprising halogenated polymeric fibers, as described in U.S. Pat. No. 5,415,959 to Pyszczek et al., which is assigned to the assignee of the present invention and incorporated herein by reference. Examples of halogenated polymeric materials that are suitable for the present invention include, but are not limited to, polyethylene tetrafluoroethylene which is commercially available under the name Tefzel, a trademark of the DuPont Company, polyethylenechlorotrifluoroethylene which is commercially available under the name Halar, a trademark of the Allied Chemical Company, and polyvinylidene fluoride.

FIGS. 1 to 3A, 3B and 5 illustrate that the casing upper subassembly 20 comprises the upper plate-shaped lid 16 having an annular peripheral edge 16A extending to and meeting a lid upper surface 16B spaced from a lid lower surface 16C. An inner annular recess 16D extends inwardly from the upper surface 16B part-way through the thickness of the lid 16. The lid thickness is defined as the distance "x" (FIG. 8) measured from the lid upper surface 16B to the lid lower surface 16C and ranges from about 0.0055 inches to about 0.025 inches. The annular recess 16D is spaced radially inwardly from the annular edge 16A to form an annular embossed rim 16E having a height "y" measured from the lid upper surface 16B to the recess surface 16D and a width "z" measured from the lid annular peripheral edge 16A to an inner surface 16F of the rim 16E. The height "y" of the embossed rim 16E ranges from about 0.0005 inches to about 0.010 inches, and the width "z" of the rim ranges from about 0.001 inches to about 0.012 inches.

Figure 8:
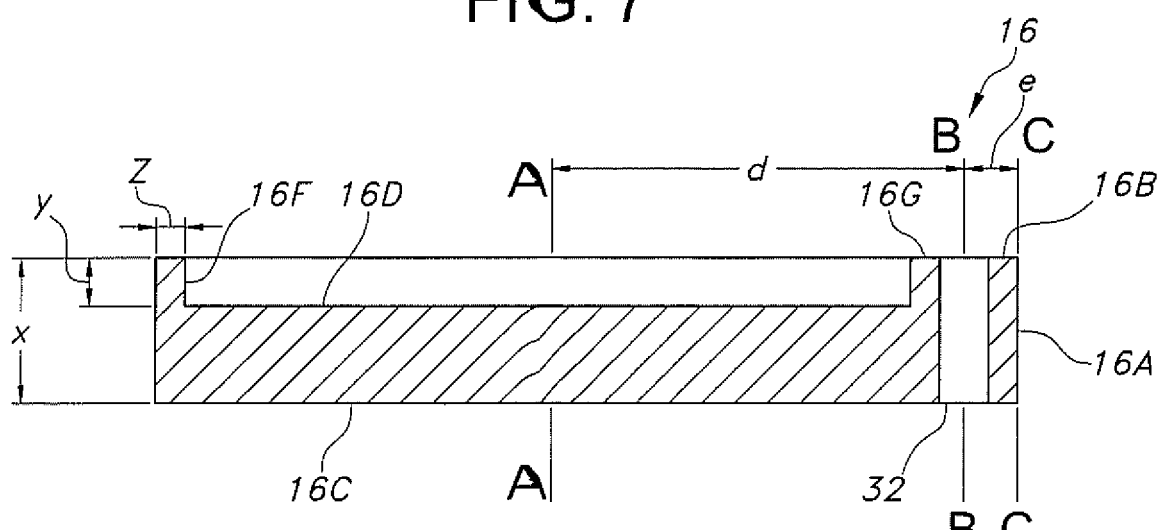
FIG. 8 is a cross-sectional view taken along line 8-8 of FIG. 7.

An electrolyte fill opening or port 32 extends through the thickness of the lid 16 at the annular embossed rim 16E. A sleeve 16G as a portion of the lid surrounds the fill port 32. The sleeve 16G is a continuous extension of the embossed rim 16E so that the sleeve and rim together define the fill port 32. In that respect, the fill port 32 resides substantially off-center in the lid 16, spaced a relatively short distance inwardly from the annular peripheral edge 16A. As shown in FIG. 8, the lid 16 has a longitudinal axis A-A and the fill port 32 has a longitudinal axis B-B. The distance "d" between the respective axes A-A and B-B ranges from about 0.0185 inches to about 0.30 inches. Further, the distance "e" from the longitudinal axis B-B of the fill port 32 to the closest tangent line C-C to the annular peripheral edge 16A of the lid 16 ranges from about 0.0015 inches to about 0.035 inches. Thus, the diameter of the lid 16 ranges from about 0.040 inches to about 0.67 inches and is 2x the sum of distance "d" plus distance "e". The significance of the positioning of the fill port 32 in the lid 16 will be described in greater detail hereinafter. In any event, the fill port 32 provides an open path from the upper surface 16B to the lower surface 16C of the lid 16.

In a primary system (FIG. 3A), a current collector is first contacted to the lid 16 followed by a cathode active material, for example $CF_x$. In a secondary system (FIG. 3B), a carbonaceous coating 35 is deposited on the lid 16 followed by the anode active material 34. Regardless whether the electrochemical cell 10 is a primary or secondary system, the active material 34 is deposited on the current collector/carbonaceous coating 35 using any one of many suitable techniques including being pressed into contact with the current collector/carbonaceous coating 35, preformed into a sheet that is pressed into contact with the current collector/carbonaceous coating 35, sprayed onto the current collector/carbonaceous coating 35, sputtered onto the current collector/carbonaceous coating 35, or coated on the current collector/carbonaceous coating 35. While not intending to limit the present electrochemical cell 10, the active material 34 has a thickness extending to its upper and lower faces 34B, 34C that ranges from about 5 μm to about 1 mm. In other embodiments, the anode active material 34 has a thickness that is greater than 1 mm.

Figure 3A:
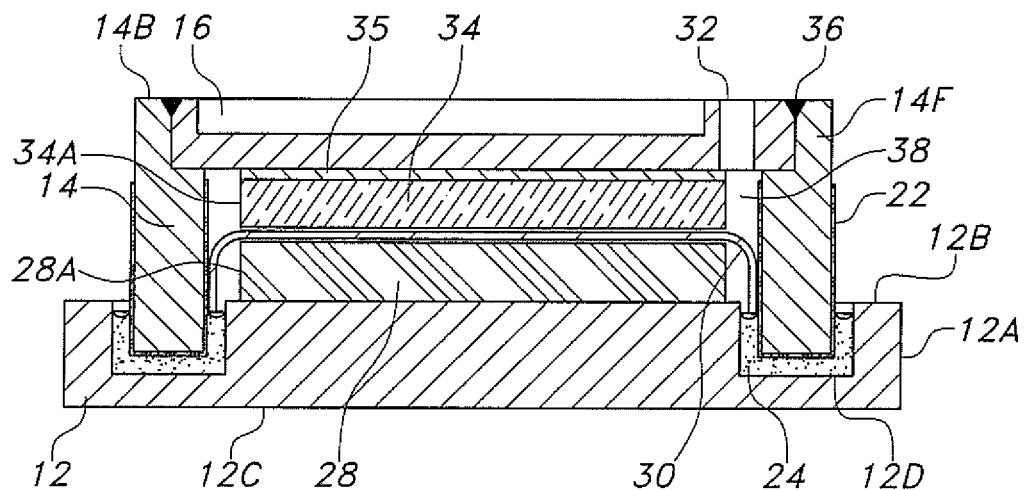
FIG. 3A is a cross-sectional view along line 3A-3A of FIG. 2 showing an exemplary primary electrochemical cell 10.

Illustrative anode active materials 34 for a secondary system (FIG. 3B) include carbon-based materials selected from coke, graphite, acetylene black, carbon black, glass carbon, hairy carbon, and mixtures thereof, or lithiated materials selected from $Li_4Ti_5O_{12}$, lithiated silver vanadium oxide, lithiated copper silver vanadium oxide, lithiated copper sulfide, lithiated iron sulfide, lithiated iron disulfide, lithiated titanium disulfide, lithiated copper vanadium oxide, $Li_xCu_wAg_yV_2O_z$ with $0.5 \leq x \leq 4.0$, $0.01 \leq w \leq 1.0$, $0.01 \leq y \leq 1.0$ and $5.01 \leq z \leq 6.5$, and mixtures thereof. Lithium is also a suitable anode active material for a primary system (FIG. 3A).

Figure 3B:
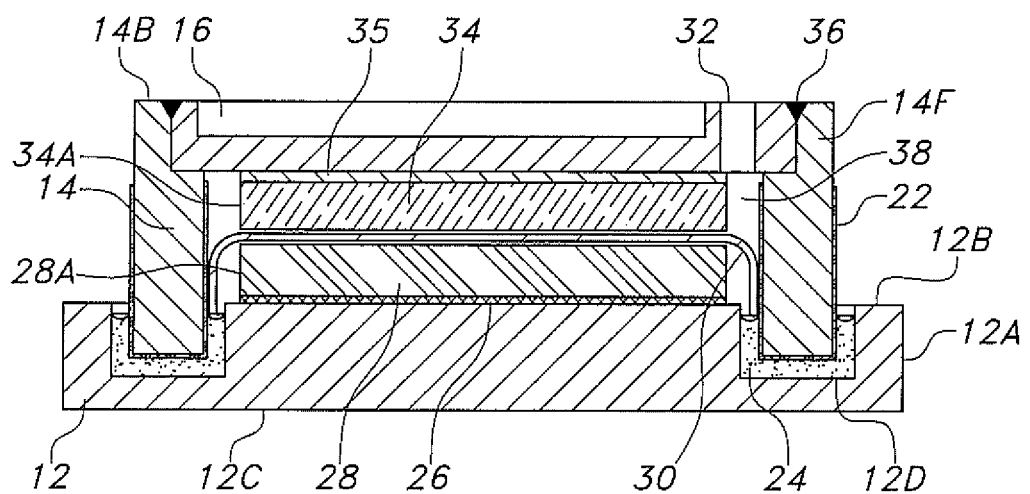
FIG. 3B is a cross-sectional view along line 3B-3B of FIG. 2 showing an exemplary secondary electrochemical cell 10.

The lid 16 has a diameter that is sized to fit into the second or upper cylindrically-shaped portion 14F of the annular sidewall 14, supported on the step 14E. In this seated position, the upper planar surface 16B of the lid 16 is substantially co-planar with the upper annular edge 14B of the sidewall 14. As shown in FIGS. 1, 3A and 3B, the lid 16 is hermetically secured or sealed to the sidewall 14 with an annular weld 36. In that respect, a benefit attributed to the embossed rim 16E is that it provides material that absorbs heat energy during the laser welding process and that acts as filler material at the weld joint.

An activating electrolyte (not shown) is then filled into the casing through the fill port 32. The fill port 32 is in fluid flow communication with an annular space or annulus 38 provided between the outer annular edges 28A and 34A of the respective active materials 28, 34 and the inner surface of the lower cylindrically-shaped portion 14D of the annular sidewall or the dielectric material 22 supported on the cylindrically-shaped portion 14D, and allows the casing to be filled with electrolyte using a vacuum filling process.

Without this axial alignment, the electrode assembly would need to be soaked in electrolyte and the remaining casing void volume filled with additional electrolyte prior to welding the lid 16 to the annular sidewall 14. Soaking the electrode assembly in electrolyte creates multiple problems. First, internal voids within the opposite polarity electrode active materials are not optimally filled with electrolyte without a vacuum drawing electrolyte into all available porosity. A second issue relates to the difficulty in welding the lid 16 to the annular sidewall 14 in the presence of electrolyte. Heat generated by the welding process can cause electrolyte to evaporate and form out-gassing byproducts that can contaminate the weld 36, thereby reducing weld integrity.

Figure 7:
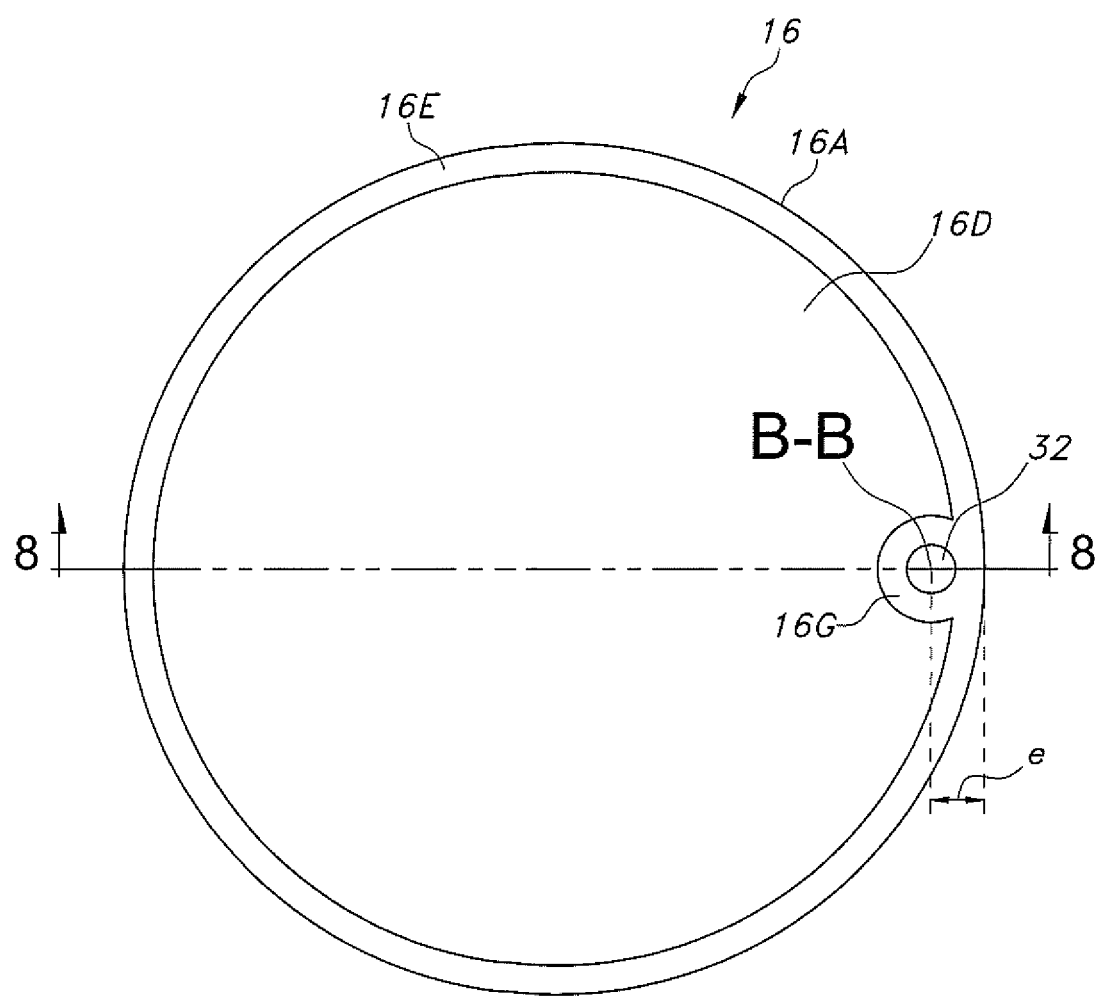
FIG. 7 is a plan view of the lid 16 shown in FIG. 6.

Thus, the purpose of the fill port 32 in fluid flow communication with the annular space 38 between the outer annular edges 28A and 34A of the opposed polarity active materials 28 and 34 and the inner surface of the lower cylindrically-shaped portion 14D of the annular sidewall 14 or the inner surface of the dielectric material 22 supported on the cylindrically-shaped portion 14D is to provide an open pathway for electrolyte to flow downwardly past the active material 34 to wet the lower active material 28 and the intermediate separator 30. This is especially important in the miniature electrochemical cells of the present invention having a size or total volume that is less than 0.5 cc. In such small size cells, the desired volume of electrolyte is sufficient to activate the opposed polarity active materials 28, 34 without there being an overabundance of electrolyte. Without the above-described alignment of the fill port 32 and the internal annular space 38, it is sometimes difficult for the electrolyte to sufficiently wet the electrode assembly 28, 34 to promote acceptable cell discharge. Further, the distance "e" (FIGS. 7 and 8) from the longitudinal axis B-B of the fill port 32 to the closest tangent line C-C to the annular peripheral edge 16A of the lid ranging from about 0.0015 inches to about 0.035 inches provides sufficient lid material at the fill port 32 to ensure that when the fill port is hermetically welded shut, the lid will not be structurally compromised by the welding process, thereby ensuring long-term hermeticity for the electrochemical cell 10 of the present invention.

The fill port 32 is preferably, closed with a closure plug (not shown) that has been press-fit into the opening 32 defined by the sleeve 16G as a continuous extension of the embossed rim 16E. This is followed by welding the closure plug to the embossed rim 16E and sleeve 16G. Alternately, the fill port 32 is closed by directing a laser beam at the embossed rim 16E and sleeve 16G to cause the rim and sleeve to flow into and hermetically seal the port 32. Suitable closure systems for sealing an electrolyte fill port axe described in U.S. Pat. No. 6,610,443 to Paulot et al., U.S. Pat. No. 7,128,765 to Paulot et al. and U.S. Pat. No. 10,446,825 to Voss et al. These patents are assigned to the assignee of the present invention and incorporated herein by reference.

The activating electrolyte is a nonaqueous and ionically conductive material mixture serving as a medium for migration of ions between the anode and cathode active materials during conversion of ions in atomic or molecular forms which migrate from the anode active material to the cathode active material. Nonaqueous electrolytes that are suitable for the present electrochemical cell 10 are substantially inert to the anode and cathode active materials, and they exhibit those physical properties necessary for ionic transport, namely, low viscosity, low surface tension and wettability.

A suitable electrolyte has an inorganic, ionically conductive lithium salt dissolved in a mixture of aprotic organic solvents comprising a low viscosity solvent and a high permittivity solvent. The inorganic, ionically conductive lithium salt serves as the vehicle for migration of the anode ions to intercalate or react with the cathode active material 34. Suitable lithium salts include $LiPF_6$, $LiBF_4$, $LiAsF_6$, LiSbF$_6$, LiClO$_4$, LiO$_2$, LiAlCl$_4$, LiGaCl$_4$, LiC(SO$_2$CF$_3$)$_3$, LiN(SO$_2$CF$_3$)$_2$, LiSCN, LiO$_3$SCF$_3$, LiC$_6$F$_5$SO$_3$, LiO$_2$CCF$_3$, LiSO$_6$F, LiB(C$_6$H$_5$)$_4$ and LiCF$_3$SO$_3$, and mixtures thereof.

Low viscosity solvents useful with the present electrochemical cell 10 include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GEL), N-methyl-pyrrolidinone (NMP), and mixtures thereof.

For example, the preferred anode active material for a primary system (FIG. 3A) is lithium metal, one preferred cathode active material is CF$_x$ and the preferred electrolyte is 0.8M to 1.5M LiAsF$_6$ or LiPF$_6$ dissolved in a 30:70 mixture, by volume, of propylene carbonate as the preferred high permittivity solvent and 1,2-dimethoxyethane as the preferred low viscosity solvent.

When the present electrochemical cell 10 is of a primary chemistry (FIG. 3A), the combined thicknesses of the current collector 26, the cathode active material 28, the separator 30, the anode active material 34 and the carbonaceous coating 35 is substantially equal to or slightly greater than the distance measured from the upper surface 12B of the base plate 12 to the step 14E. That way, there is enough stack pressure inside the casing to provide intimate contact between the anode/cathode electrode assembly to ensure acceptable discharge for the primary chemistry cell.

Alternatively, when the electrochemical cell 10 is of a secondary chemistry, the combined thicknesses of the conductive carbonaceous coating 26, the cathode active material 28, the separator 30, and the anode active material 34 is somewhat less than the distance measured from the upper surface 12B of the base plate 12 to the step 14E. That way, there is enough free space inside the casing to accommodate expansion and contraction of the electrode stack or anode/cathode electrode assembly as the electrochemical cell 10 of the secondary chemistry is subjected to charge and discharge cycles.

In a primary system (FIG. 3A), with the cathode active material 28/anode active material 34 activated with the electrolyte and housed inside the casing comprising the casing base subassembly 18 (FIG. 4) hermetically sealed to the casing upper subassembly 20 (FIG. 5), the lid 16 welded to the annular sidewall 14 in contact with the cathode active material 34 serves as the positive terminal, and the base plate 12 in electrical continuity with the anode active material 28 serves as the negative terminal for the cell.

As those skilled in the art will readily appreciate, in a primary system (FIG. 3A), the cathode active material can be switched with the anode active material. In this alternate embodiment, the cathode active material in electrical continuity with base plate 12 serves as the positive terminal and the anode active material in continuity with the lid 16 welded to the annular sidewall 14 serves as the negative terminal. In a similar manner, the secondary system illustrated in FIG. 3B can have the respective anode and cathode active materials switched with their position shown in the drawing. In that case, the anode active material is in electrical continuity with the base plate 12 serving as the negative terminal and the cathode active material in electrical continuity with eth lid 16 serves as the positive terminal.

With the base plate 12 having a surface area ranging from about 1 mm$^2$ to about 1 cm$^2$ (surface area of either of the upper and lower surfaces 12B, 12C), the upper surface 16B of the lid 16 and the upper edge 14B of the annular sidewall 14 having a combined surface area ranging from about 1 mm$^2$ to about 1 cm$^2$, and with the height of the casing as measured from the lower surface 12C of the base plate 12 to the upper edge 14B of the annular sidewall 14 ranging from about 250 µm to about 2.5 mm, the present electrochemical cell 10 represents an advancement in electrochemical technology. The cell can be built with a total volume that is less than 0.5 cc but, as a hermetically sealed enclosure, is capable of being implanted in human or animal body tissue for extended periods of time.

Further, a method for providing an electrochemical cell 10 according to the present invention comprises first providing a casing. That is done by providing a base plate 12 and an annular sidewall 14. The base plate 12 has an annular channel that extends part-way into the thickness of the base plate and is spaced inwardly from an annular peripheral edge 12A thereof. The annular sidewall 14 extends to an upper annular edge 14B spaced from a lower annular edge 14C, and an outer annular surface 14A spaced from an inner surface. The inner surface is provided with a step 14E. A dielectric material 22 is coated on the lower annular edge 14C and at least a portion of the inner surface of the annular sidewall 14.

Next, a ring-shaped sealing glass 24 is nested in the annular channel 12D of the base plate 12 and annular sidewall 14 is seated on the glass. This subassembly is heated to form a glass-to-metal seal with the base plate 12 and a glass-to-ceramic seal with the dielectric material 22 at the lower annular edge 14C of the annular sidewall 14. If desired, the dielectric material 22 can only coat the lower cylindrically-shaped portion 14D of the annular sidewall. That way, the sealing glass 24 seals directly to the base plate 12 and the annular sidewall 14.

Separately, a Lid 16 is provided. The lid 16 has an electrolyte fill port 32 extending through its thickness from a lid upper surface 16B to a spaced apart lid lower surface 16C. The lid 16 also has a recess 16D extending inwardly from the lid upper surface into its thickness.

An electrode assembly is then provided. The electrode assembly comprises a first active material 28 and a second, opposite polarity active material 34. One of the first and second active materials 28, 34 is in electrical continuity with the lid 16 serving as one terminal for the cell. The other of the first and second active materials 28, 34 is in electrical continuity with the base plate 12 serving as the other terminal. A separator 30 is positioned to segregate the first active material 28 from directed physical contact with the second active material 34.

The electrochemical cell is completed when the lid 16 is seated on the step 14E of the annular sidewall 14 and welded 36 to the upper annular edge 14B thereof. Importantly, the lid 16 is provided with an embossed rim 16E extending between its outer peripheral edge 16A and the recess 16D. When the lid 16 is welded to the annular sidewall 14, the material comprising the rim 16E provides sufficient material to both absorb heat created at the weld and to provide material that flows into the gap between the lid 16 and the sidewall 14 to provide a hermetic seal between these casing members. The heat absorbed by the rim 16E helps to prevent structural compromise of the glass-to-metal and glass-to-ceramic seals between the annular sidewall 14 and the base plate 12.

This is followed by filling an activating electrolyte into the casing through the electrolyte fill port 32 in the lid 16 and then closing the fill port. Also, an annulus 38 resides between the inner surface of the annular sidewall 14 and the electrode assembly. The electrolyte fill port 32 is axially aligned with this annulus 38. That way, electrolyte filled into the casing through the fill port 32 readily wets the electrode assembly to thereby promote extended cell discharge.

It is appreciated that various modifications to the inventive concepts described herein may be apparent to those of ordinary skill in the art without departing from the spirit and scope of the present invention as defined by the appended claims.

What is claimed is:

1. An electrochemical cell, comprising:
a) a casing, comprising:
   i) a metallic annular sidewall extending to an upper annular edge defining an upper open end spaced from a lower annular edge defining a lower open end, the metallic annular sidewall having an outer surface spaced from an inner surface;
   ii) a metallic lid closing the upper annular edge of the annular sidewall, wherein the metallic lid has a hermetically sealed electrolyte fill port, and the electrolyte fill port extends through a lid thickness from a lid upper surface to a spaced apart lid lower surface;
   iii) a metallic base plate;
   iv) a dielectric material coating the lower annular edge and at least a portion of the inner surface of the metallic annular sidewall; and
   v) a ring-shaped sealing glass in a glass-to-metal seal relationship with the metallic base plate and in a glass-to-ceramic seal relationship with the dielectric material coating the lower annular edge of the metallic annular sidewall so that the sealing glass electrically isolates the metallic base plate from the metallic sidewall closed by the metallic lid; and
b) an electrode assembly housed inside the casing, the electrode assembly comprising:
   i) an anode active material;
   ii) cathode active material; and
   iii) a separator segregating the anode active material from directed physical contact with the cathode active material,
   iv) wherein one of the anode and the cathode active materials is in electrical continuity with the metallic lid serving as one terminal for the cell, and the other of the anode and the cathode active materials is in electrical continuity with the metallic base plate serving as the other terminal for the cell; and
c) an electrolyte filled in the casing to activate the electrode assembly.

2. The electrochemical cell of claim 1, wherein the metallic base plate has an annular peripheral edge and a base plate thickness extending from a base plate upper surface to a base plate lower surface, and wherein the metallic base plate has an annular channel that is spaced inwardly from the annular peripheral edge, the annular channel extending part-way into the thickness of the metallic base plate from the base plate upper surface, and wherein the sealing glass resides in the annular channel of the metallic base plate to form the glass-to-metal seal with the base plate and the glass-to-ceramic seal with the dielectric material at the lower annular edge of the metallic annular sidewall.

3. The electrochemical cell of claim 1, wherein the sealing glass forms the glass-to-ceramic seal with the dielectric material at the lower annular edge and at the inner and outer surfaces of the metallic annular sidewall.

4. The electrochemical cell of claim 1, wherein the dielectric material is an alumina ($Al_2O_3$).

5. The electrochemical cell of claim 1, wherein the outer surface of the metallic annuler sidewall is cylindrical.

6. The electrochemical cell of claim 1, wherein an annulus resides between the inner surface of the metallic annular sidewall and the electrode assembly, and the electrolyte fill port is axially aligned with the annulus.

7. The electrochemical cell of claim 1, wherein the inner surface of the metallic annular sidewall is provided with a step, and wherein the metallic lid is seated on the step.

8. The electrochemical cell of claim 1, wherein an upper surface of the metallic lid is substantially co-planar with the upper annular edge of the metallic annular sidewall.

9. The electrochemical cell of claim 1, wherein the electrolyte fill port is either welded closed or provided with a closure plug that is welded to the metallic lid to hermetically seal the electrolyte fill port.

10. The electrochemical cell of claim 1, wherein a recess extends inwardly from the lid upper surface part-way into the thickness of the metallic lid to thereby provide an annular rim extending between the outer peripheral edge of the metallic annular sidewall and the recess, and wherein the metallic lid is welded to the metallic annular sidewall with the annular rim at least partially filling into a gap between the lid and the annular sidewall.

11. The electrochemical cell of claim 1, wherein the anode active material is selected from coke, graphite, acetylene black, carbon black, glass carbon, hairy carbon, LiaTis0: 2, lithiated silver vanadium oxide, lithiated copper silver vanadium oxide, lithiated copper sulfide, lithiated iron sulfide, lithiated iron disulfide, lithiated titanium disulfide, lithiated copper vanadium oxide, $Li_xCu_{\omega}Ag_yV_2O_2$ with $0.5 \le 4.0$, $0.01 \le w \le 1.0$, $0.01 \le y \le 1.0$ and $5.01 \le z$ v $6.5$, lithium, and mixtures thereon, and wherein the cathode active material is selected from lithium nickel manganese cobalt oxide $LiCoO_2$, $LiNiO_2$, $LiMnO_2$, TiS, FeS, $FeS_2$, $CF_x$, $Ag_2O$, $Ag_2O_2/Ag_2CrO_4$, silver vanadium oxide (SVO), copper silver vanadium oxide (CSVO), $V_2O_s$, $MnO_2$.

12. The electrochemical cell of claim 1 having a total volume that is less than 0.5 cc.

13. An electrochemical cell, comprising:
a) a casing, comprising:
   i) a metallic annolar sidewall extending to an upper annular edge spaced from a lower annular edge, and an outer annular surface spaced from an inner surface, wherein the inner surface of the metallic annular sidewall is provided with a step;
   ii) a metallic lid seated on the step to close the upper annular edge of the metallic annular sidewall, wherein the metallic lid has a hermetically sealed electrolyte fill port and the electrolyte fill port extends through a lid thickness from a lid upper surface to a spaced apart lid lower surface;
   iii) a metallic base plate;
   iv) an alumina coating the lower annular edge and at least a portion of the inner surface of the metallic annular sidewall; and
   v) a ring-shaped sealing glass in a glass-to-metal seal relationship with the metallic base plate and in a glass-to-ceramic seal relationship with the alumina at the lower annular edge of the metallic annular sidewall so that the sealing glass electrically isolates the metallic base plate from the metallic sidewall closed by the metallic lid; and b) an electrode assembly housed inside the casing, the electrode assembly comprising:
   i) an anode active material;
   ii) a cathode active material; and
   iii) a separator segregating the anode active material from directed physical contact with the cathode active material,
   iv) wherein one of the anode and the cathode active materials is in electrical continuity with the metallic lid serving as one terminal for the cell, and the other of the anode and the cathode active materials is in electrical continuity with the metallic base plate serving as the other terminal for the cell; and c) an electrolyte filled in the casing to activate the electrode assembly.

14. The electrochemical cell of claim 13, wherein the metallic base plate has an annular peripheral edge and a base plate thickness extending from a base plate upper surface to a base plate lower surface, and wherein the metallic base plate has an annular channel that is spaced inwardly from the annular peripheral edge, the annular channel extending part-way into the thickness of the metallic base plate from the base plate upper surface, and wherein the sealing glass resides in the annular channel of the metallic base plate to form the glass-to-metal seal with the base plate and the glass-to-ceramic seal with the alumina at the lower annular edge of the metallic annolar sidewall.

15. The electrochemical cell of claim 13, wherein the sealing glass forms the glass-to-ceramic seal with the alumina at the lower annular edge and at the inner and outer surfaces of the metallic annular sidewall.

16. The electrochemical cell of claim 13, wherein an annulus resides between the inner surface of the metallic annular sidewall and the electrode assembly, and the electrolyte fill port is axially aligned with the annulus.

17. The electrochemical cell of claim 13, wherein a recess extends inwardly from the lid upper surface part-way into the thickness of the metallic lid to thereby provide an annular rim extending between the outer peripheral edge of the annular sidewall and the recess, and wherein the metallic lid is welded to the annular sidewall with the annular rim at least partially filling into a gap between the lid and the metallic annular sidewall.

18. A method for providing an electrochemical cell, the method comprising the steps of:
   a) providing a casing, comprising:
      i) providing a metallic annular sidewall extending to an upper annular edge spaced from a lower annular edge, and an outer annular surface spaced from an inner surface, wherein the inner surface of the metallic annular sidewall is provided with a step;
      ii) coating a dielectric material on the lower annular edge and at least a portion of the inner surface of the metallic anular sidewall;
      iii) providing a metallic base plate;
      iv) positioning a ring-shaped sealing glass on an iv) upper surface of the metallic base plate;
      v) positioning the metallic annular sidewall on the sealing glass opposite the metallic base plate so that the dielectric material coating the lower annular edge of the annular sidewall contacts the sealing glass;
      vi) heating the metallic base plate and the metallic annular sidewall to form a glass-to-metal seal with the metallic base plate and a glass-to-ceramic seal with the dielectric material at the lower annular edge of the metallic annular sidewall so that the sealing glass electrically isolates the metallic base plate from the metallic sidewall;
      vii) providing a metallic lid having an electrolyte fill port extending through a lid thickness from a lid upper surface to a spaced apart lid lower surface; and
      viii) contacting a carbonaceous material to an upper surface of the metallic base plate;
   b) providing an electrode assembly, comprising:
      i) an anode active material;
      ii) a cathode active material;
      iii) contacting the anode active material to the metallic lid serving as a negative terminal for the cell, and contacting the cathode active material to the carbonaceous material contacting the upper surface of the metallic base plate serving as a positive terminal for the cell; and
      iv) positioning a separator segregating the anode active material from directed physical contact with the cathode active material;
   c) seating the metallic lid on the step of the metallic annular sidewall;
   d) welding the metallic lid to the upper annular edge of the metallic annular sidewall; and
   e) filling an activating electrolyte into the casing through the electrolyte fill port in the metallic lid and then closing the electrolyte fill port.

19. The method of claim 18, further including providing:
   a) the metallic base plate having an annular peripheral edge and a base plate thickness extending from a base plate upper surface to a base plate lower surface, and the base plate having an annular channel that is spaced inwardly from the annular peripheral edge, the annular channel extending part-way into the thickness of the metallic base plate from the base plate upper surface;
   b) positioning the sealing glass in the annular channel of the metallic base plate;
   c) positioning the metallic annular sidewall on the sealing glass in the annular channel of the metallic base plate; and
   d) heating the metallic base plate and the metallic annular sidewall to form the glass-to-ceramic seal with the dielectric material at the lower annular edge of the metallic annular sidewall and to form the glass-to-metal seal with the metallic base plate.

20. The method of claim 18, including providing a recess extending inwardly from the lid upper surface into the thickness of the metallic lid to thereby form an annular rim extending between an outer peripheral edge of the lid and the lid recess, and welding the metallic lid to the upper annular edge of the metallic annular sidewall with the annular rim at least partially filling into a gap between the metallic lid and the metallic annular sidewall.

21. The method of claim 18, including providing an annulus residing between the inner surface of the metallic annular sidewall and the electrode assembly, and wherein the electrolyte fill port is axially aligned with the annulus.

* * * * *